US006673183B2

United States Patent
Byerley (10) Patent No.: US 6,673,183 B2
(45) Date of Patent: Jan. 6, 2004

(54) METHOD AND APPARATUS FOR TIRE CARCASS POSITIONING ON A DRUM

(75) Inventor: Mark S. Byerley, Greenback, TN (US)

(73) Assignee: Wyko, Inc., Greenback, TN (US)

( * ) Notice: Subject to any disclaimer, the term of this patent is extended or adjusted under 35 U.S.C. 154(b) by 37 days.

(21) Appl. No.: 09/919,084

(22) Filed: Jul. 31, 2001

(65) Prior Publication Data

US 2003/0024626 A1 Feb. 6, 2003

(51) Int. Cl.[7] .............................................. B29D 30/26
(52) U.S. Cl. ....................... 156/126; 156/133; 156/135; 156/415; 156/417
(58) Field of Search ................................ 156/111, 135, 156/126, 123, 133, 396, 398, 406.2, 414, 415, 416, 417, 418, 419, 420, 421.8

(56) References Cited

U.S. PATENT DOCUMENTS 3,580,782 A * 5/1971 Leblond ..................... 156/415
3,822,165 A * 7/1974 Habert ....................... 156/415
6,408,919 B2 * 6/2002 Cordaillat et al. .......... 156/402

FOREIGN PATENT DOCUMENTS

EP          567742 A2 * 11/1993

* cited by examiner

Primary Examiner—Geoffrey L. Knable
(74) Attorney, Agent, or Firm—Pitts & Brittian, P.C.

(57) ABSTRACT

In accordance with one aspect of the present invention there is provided improved means for centering of a green vehicle tire carcass on a shaping drum. "Centering" as used herein and unless otherwise stated or obvious from the context of its use, includes positioning of the bead ring-containing. opposite ends of a carcass substantially equidistantly from the centerplane of the drum and substantially radially equidistant from, and substantially concentric about, the rotational axis of the drum. In one embodiment, the shaping drum includes first and second pluralities of lateral positioning shoes disposed about the outer circumference of thedrum, these pluralities of shoes being disposed on opposite sides of the lateral centerplane of the drum, and first and second pluralities of bidirectional (radial and lateral) positioning wheels, the pluralities of wheels also being disposed about the outer circumference of the drum, on opposite sides of the lateral centerplane of the drum, and between respective ones of the pluralities of shoes and the lateral centerplane of the drum. These shoes and wheels are selectively positionable laterally and radially of the drum to effect centering of the carcass. A method is disclosed.

20 Claims, 11 Drawing Sheets

METHOD AND APPARATUS FOR TIRE CARCASS POSITIONING ON A DRUM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates generally to methods and apparatus for use in the manufacture of vehicle tires. In particular, this invention relates to methods and apparatus for the positioning of a green tire carcass on a shaping drum. More particularly, this invention pertains to 2. Description of the Related Art In the manufacture of vehicle tires, one process operation includes positioning of a green tire carcass on a shaping drum whereupon the carcass is inflated to a generally desired toroidal shape. The green tire carcass normally is of a generally hollow cylindrical geometry having a non-extensible bead ring secured internally of each of the opposite ends of the carcass. The shaping drum of the prior art includes first and second generally cylindrical mandrels which are disposed on opposite sides of a centerplane oriented perpendicular to the longitudinal centerline of the drum. This longitudinal centerline also defines the rotational axis of the drum. The mandrels of a shaping drum are designed to engage the bead ring-containing opposite ends of the carcass and thereby hold the carcass centered on the drum relative to the centerplane and concentric with respect to the rotational axis of the drum.

In the present embodiment, each of the mandrels is of the radially expansible type, that is, each mandrel comprises a plurality of segments which are disposed radially about the rotational axis of the drum and which collectively define generally the outer circumference of an annular receiver for one of the bead rings of the carcass. The segments of each mandrel are radially moveable relative to the rotational axis of the drum for locking the bead rings of the carcass to the drum and are laterally movable to permit initial selection of the spacing between the bead rings as the carcass. and adjustment of their lateral spacing as the carcass is radially expanded to define a green tire.

For proper functioning of the shaping drum and true rotational dimensioning of the carcass into a vehicle tire, it is important that the carcass initially be positioned precisely centrally of the shaping drum both radially of the drum and laterally of the centerplane of the drum so that upon inflation of the carcass toward a toroidal geometry, all parts of the carcass move or expand uniformly with respect to one another, thereby ensuring uniformity of symmetry of the expanded carcass, as well as uniformity of distribution of the material of construction of the carcass, and ultimately, uniformity of the radial and lateral dimensions and material distribution of the finished tire.

A typical green tire carcass for an automobile will weigh 35–50 pounds or more and is relatively flimsy. Obviously, a green carcass for a truck tire, or an off-the-road (OTR) tire, will be considerably heavier and more difficult to manipulate. Accordingly, loading of the carcass onto a shaping drum is difficult in several aspects. For example, manually placing the carcass onto the drum from one end of the drum, that is "threading" of the carcass initially onto one end of the drum and further moving the carcass toward the lateral centerplane of the drum is difficult in that the carcass tends to bend, twist, collapse and/or sag due to gravity, from its open cylindrical geometry when lifted by an operator or a mechanical transfer device. After the carcass has been initially threaded onto the drum, there remains the problem of completing the centering the carcass relative to the lateral centerplane of the drum so that the bead rings are disposed on opposite sides of, and equidistantly from the centerplane of the drum and equidistant radially about the rotational axis of the drum. These and other positioning efforts are frustrated by the tendency of the carcass to "sag" under the effects of gravity thereby impeding the radial centering of the carcass relative to the longitudinal centerline of the drum before, or as, the bead rings become locked to the mandrels of the drum. Failure to center the carcass both radially and longitudinally of the shaping drum can result in non-uniform distribution of the material of the carcass, hence of the finished tire, with the result that the finished tire is unacceptably "out of round" and must be scrapped.

BRIEF SUMMARY OF THE INVENTION

In accordance with one aspect of the present invention there is provided improved means for centering of a green tire carcass on a shaping drum. "Centering" as used herein and unless otherwise stated or obvious from the context of its use, includes positioning of the bead ring-containing opposite ends of a carcass substantially equidistantly from the centerplane of the drum and substantially radially equidistant from, and substantially concentric about, the rotational axis of the drum. In one embodiment, the shaping drum includes first and second pluralities of lateral positioning shoes disposed about the outer circumference of the drum, these pluralities of shoes being disposed on opposite sides of the lateral centerplane of the drum, and first and second pluralities of bidirectional (radial and lateral) positioning wheels, the pluralities of wheels also being disposed about the outer circumference of the drum, on opposite sides of the lateral centerplane of the drum, and between respective ones of the pluralities of shoes and the lateral centerplane of the drum. These shoes and wheels are selectively positionable laterally and radially of the drum.

DETAILED DESCRIPTION OF THE INVENTION

Figure 1:
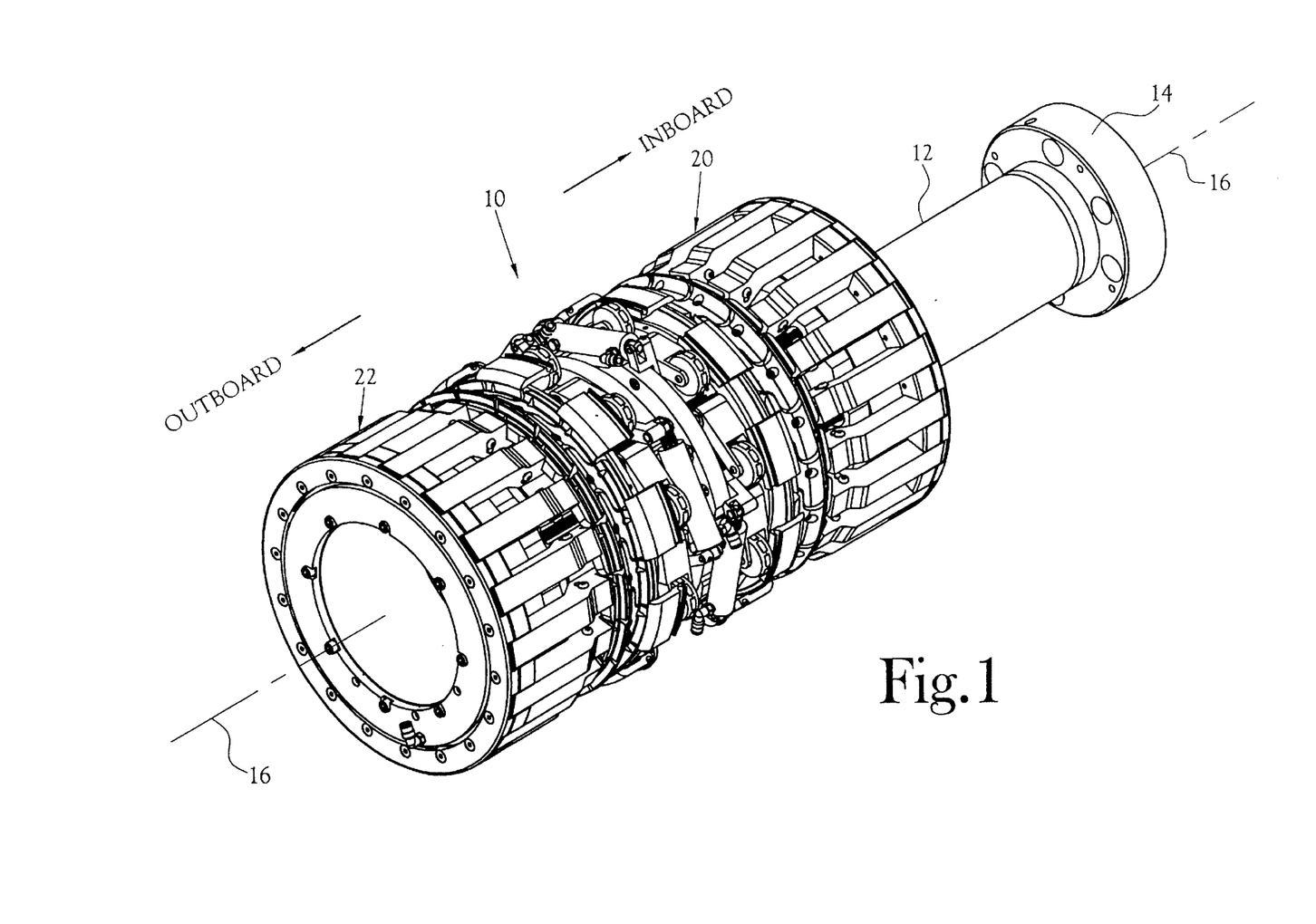
FIG. 1 is a representation of a shaping drum embodying various of the features of the present invention.
Figure 2:
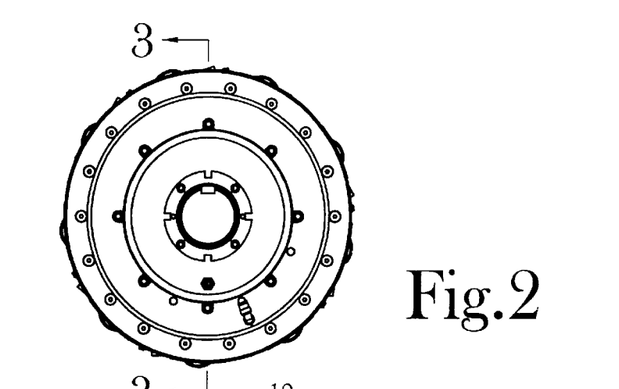
FIG. 2 is an end view of the drum depicted in FIG. 1.
Figure 3:
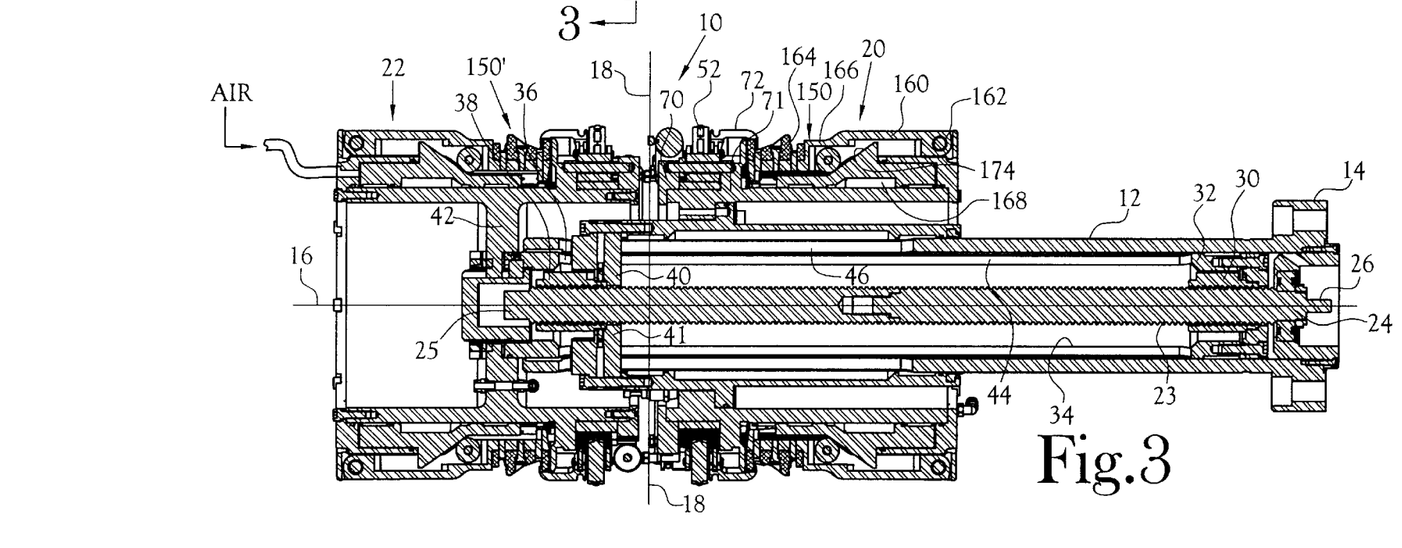
FIG. 3 is a side elevation view, in section, of the drum depicted in FIG. 1.

Referring initially to FIGS. 1–3, in the depicted embodiment of the drum 10 of the present invention, there is provided a central (rotational) shaft 12 having a radial shoulder 14 suitable for attachment of the depicted drum to a conventional drive system for a shaping drum. The depicted drum includes a rotational axis 16 and a centerplane 18 (see FIG. 4). The drum is divided into substantially a first (inboard) section 20 and a second (outboard) section 22, each section being mounted on the shaft 12 for simultaneous rotation of the sections upon rotation of the shaft 12. Further, each section is translatable laterally of the centerplane of the drum, the two sections moving substantially simultaneously toward the centerline or substantially simultaneously away from the centerline. Common or equivalent components of the two sections of the drum are designated using primed numerals.

Referring specifically to FIG. 3, in the depicted drum, internally of the shaft 12 there is provided a lead screw 23 having one of its opposite ends 24 rotatably mounted in the inboard end of the shaft 12 and its opposite (outboard) end 25 rotatably mounted internally of the outboard section 22 of the drum. The inboard end 24 of the lead screw projects laterally outwardly of the drum to define a lug 26 by means of which the lead screw may be rotated relative to the shaft 12.

Adjacent the inboard end of the lead screw, there is provided a lead nut 30 which threadably encircles the lead screw and whose outer circumference is secured to the inboard end 32 of a first hollow cylindrical tube 34 so that upon rotation of the lead screw, the lead nut and its attached tube 34 move inwardly or outwardly relative to the shaft 12, depending upon the direction of rotation of the lead screw. Adjacent the outboard end 36 of the tube 34, there is provided a second lead nut 38 which threadably encircles the outboard end 25 of the lead screw and which has its outer circumference attached to mounting lugs 40, 41 which, in turn, are attached to the inboard section 20 of the drum at diametrically opposite locations about the shaft 12. Further, the outboard end 36 of the tube 34 is attached by a mounting ring 42 to the outboard section 22 of the drum. Thus, it will be seen that rotation of the lead screw effects lateral movement of the two halves 20,22 of the drum relative to each other. By design, rotation of the lead screw effects about twice as much lateral movement of the inboard drum section 20 as the lateral movement of the outboard section 22 of the drum. To accommodate this relative movement between the drum halves, the tube 34 is provided with a slot 44 which extends substantially from end to end of the tube 34 and the shaft 12 within which the tube is slidably mounted, is provided with a slot 46 which extends from proximate the outboard end of the shaft 12 to a point about midway along the length of the shaft 12. These slots are in register and the mounting lugs 40,41 reside in and slide along these registered slots. This construction provides for lateral movement of the drum halves relative to one another, without rotational movement of either section relative to the shaft 12 or the tube 34. By this means, all of the components of each of the two sections 20,22 are translatable laterally relative to the centerplane 18 of the drum.

As depicted in the several Figures, in the depicted embodiment, each of the inboard and outboard drum sections 20,22, includes a carcass alignment subassembly 50,52, these assemblies being substantially mirror images of one another.

Figure 4:
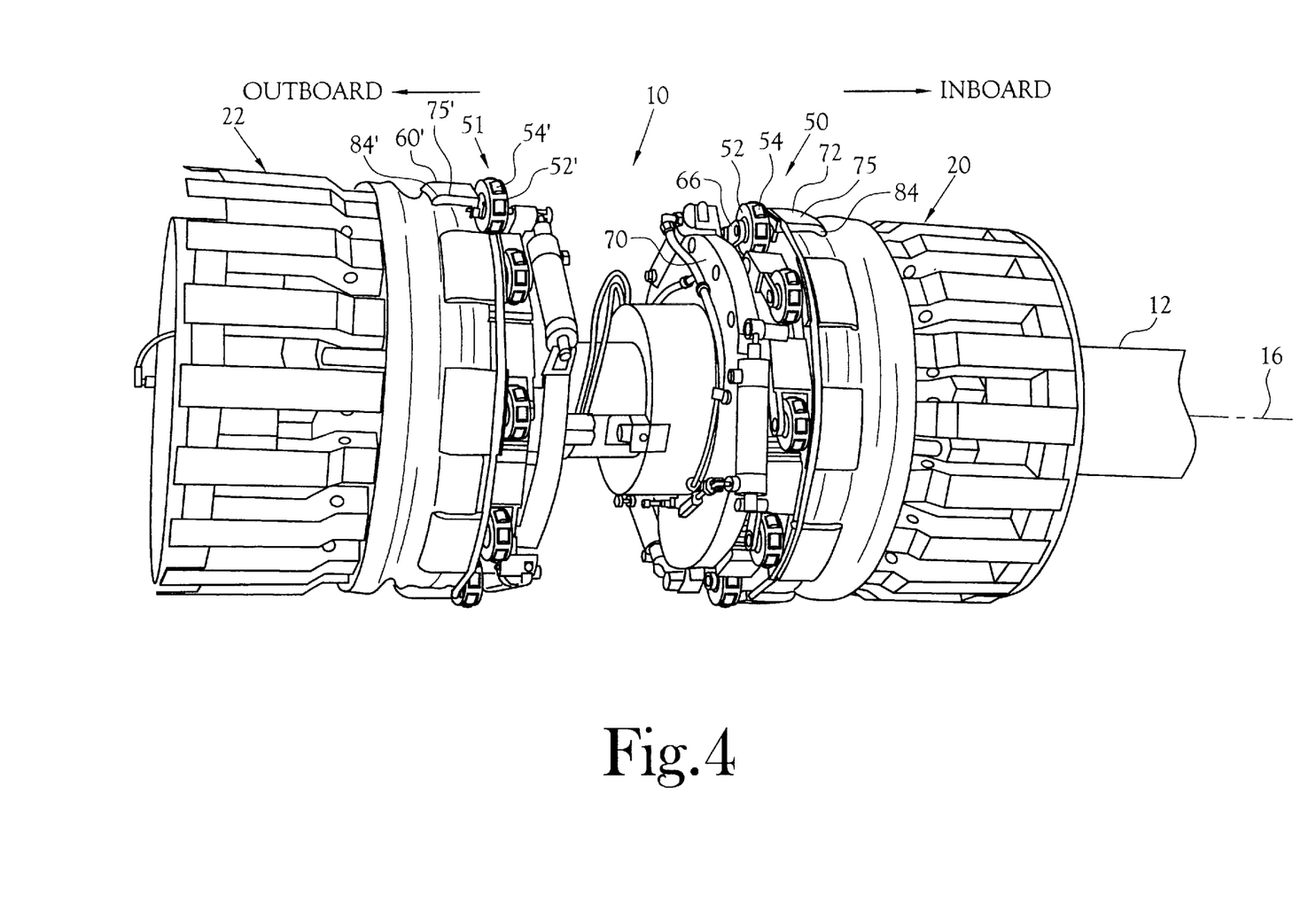
FIG. 4 is a representation of a drum in accordance with the present invention and depicting the opposite sections of the drum in their spaced apart relationship and with the carcass positioning shoes and wheels disposed in their radially retracted positions.
Figure 5:
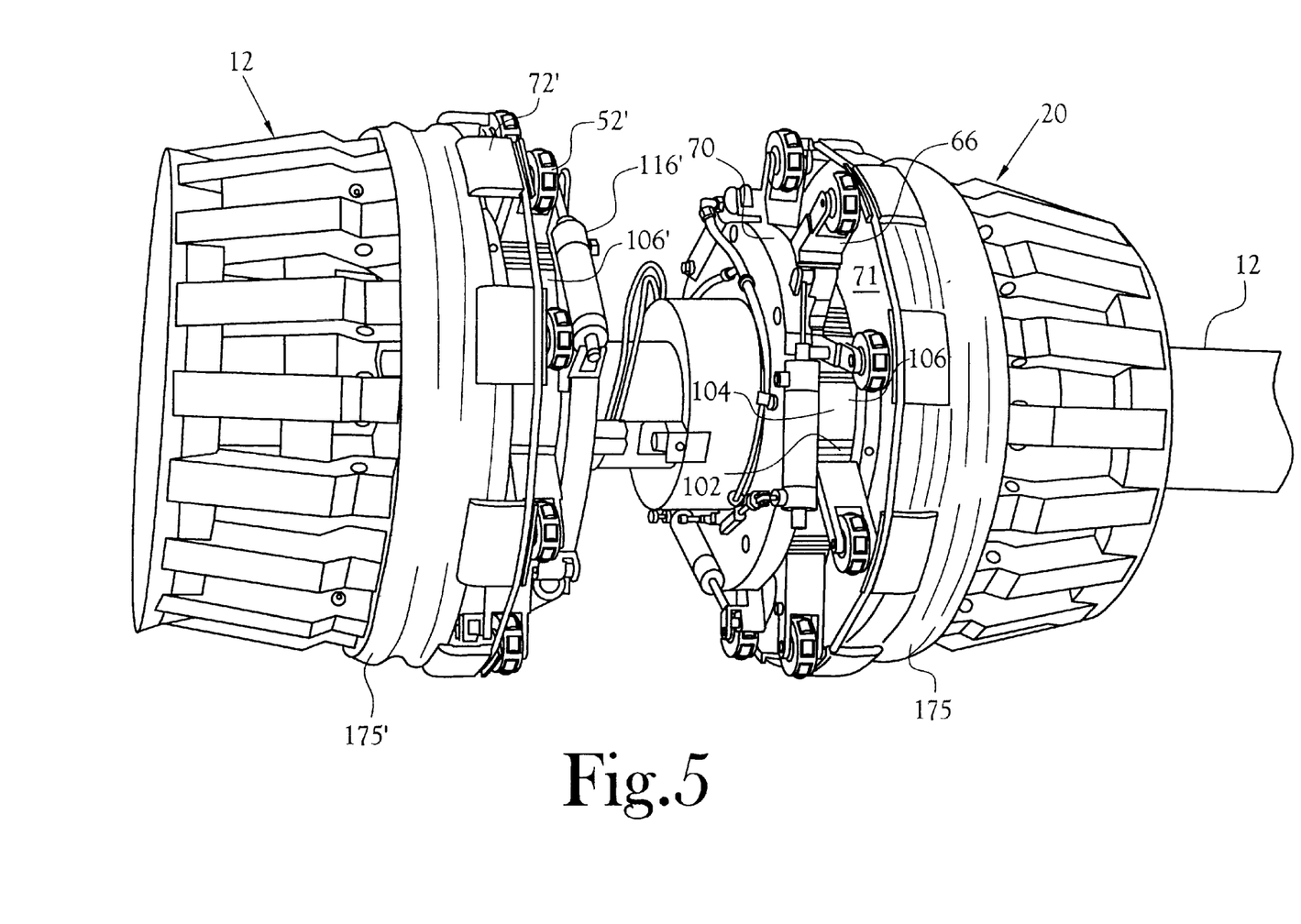
FIG. 5 is a representation of the drum depicted in FIG. 4 with the positioning shoes and wheels disposed in their radially extended positions.
Figure 9:
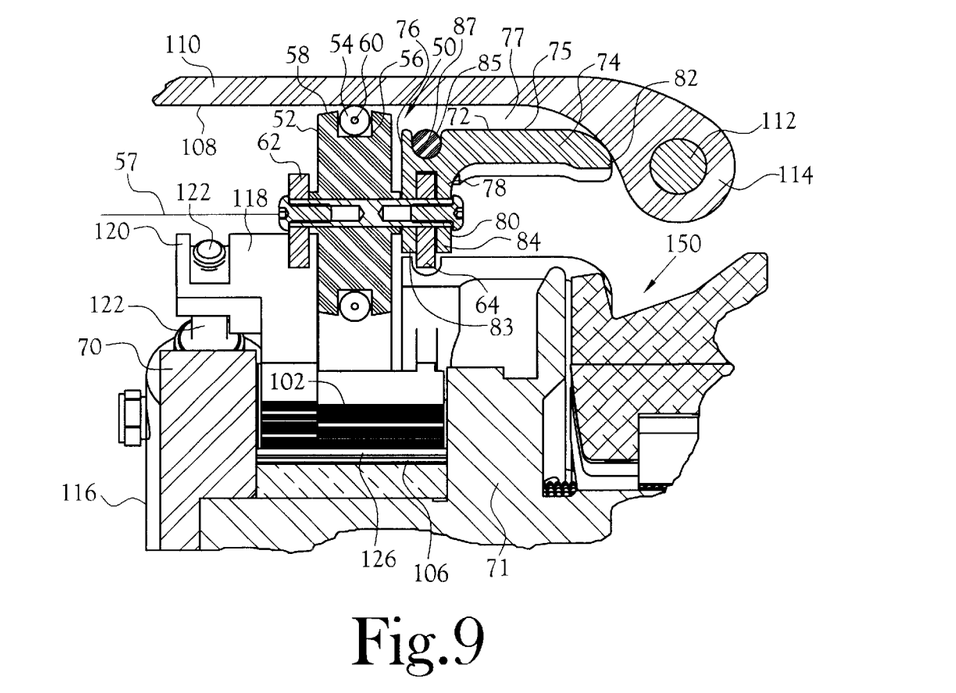
FIG. 9 is a detail view of a portion of the drum depicted in FIG. 8 and taken generally along the line 8—8 of FIG. 7.
Figure 14:
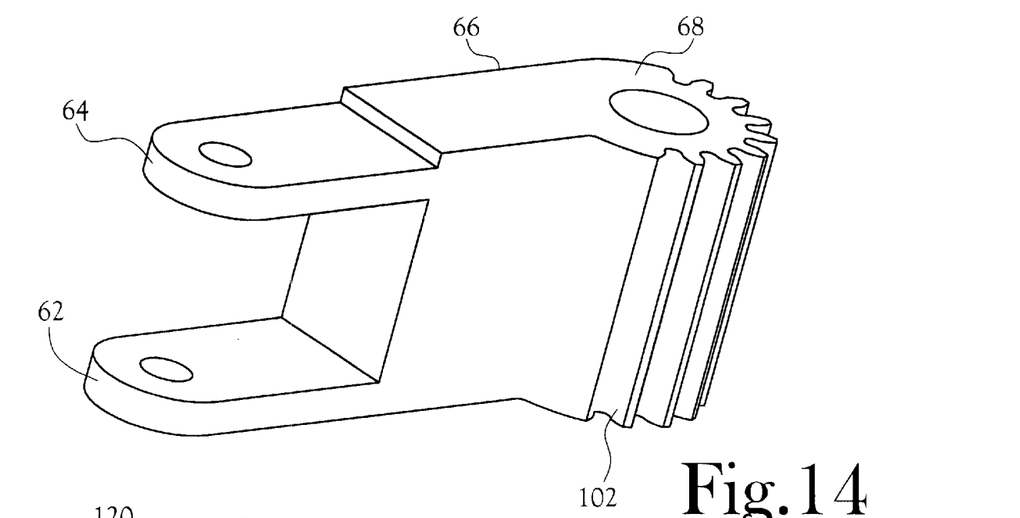
FIG. 14 is a representation of a mounting arm for a positioning wheel of the present invention.
Figure 15:
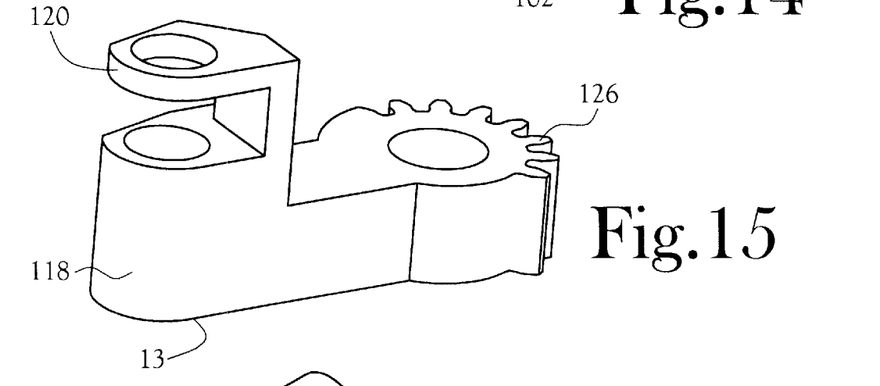
FIG. 15 is a representation of a mounting lug for the base end of the cylinder of a piston/cylinder actuating device for effecting radial movement of the shoes/wheels of the present invention.
Figure 16:
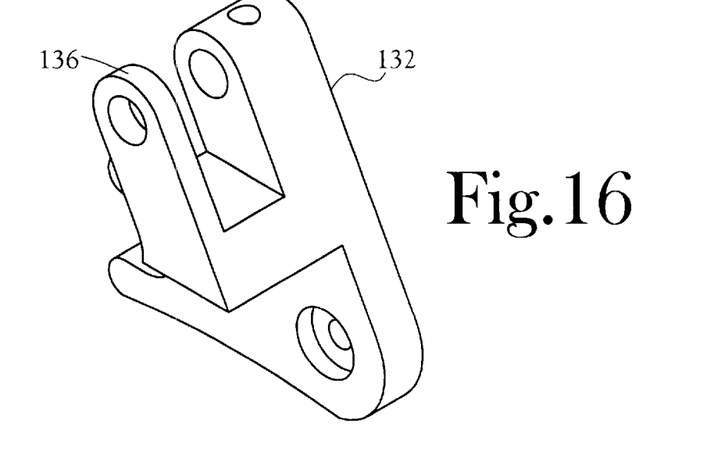
FIG. 16 is a representation of a lever arm for interconnecting the outboard end of a piston rod of a piston/cylinder actuation device with a driven gear ring employed in one embodiment of the present invention.
Figure 17:
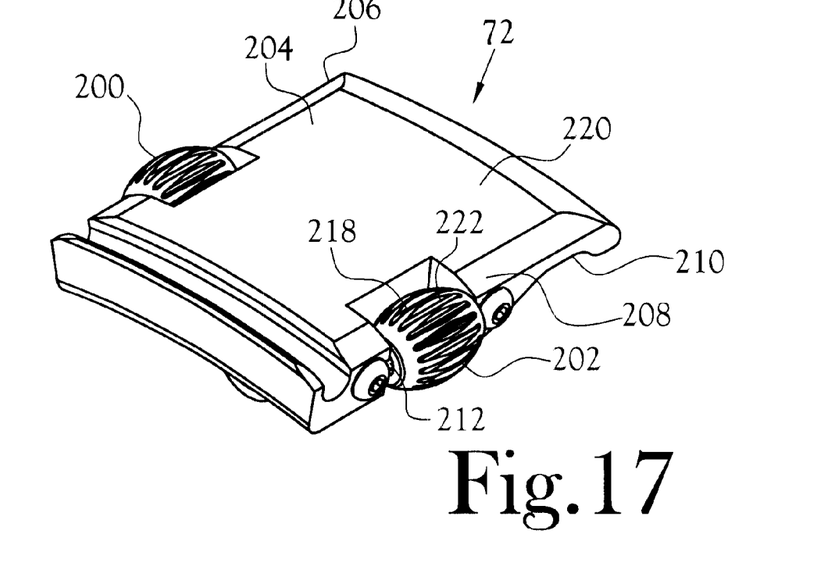
FIG. 17 is a representation of an alternative embodiment of a positioning shoe as employed in the present invention.
Figure 18:
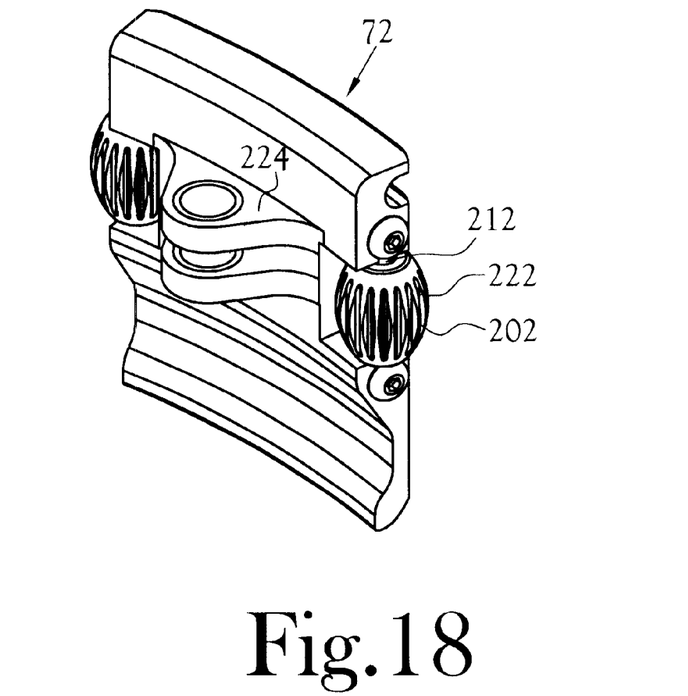
FIG. 18 is a further representation of the positioning shoe depicted in FIG. 17.

Referring specifically to the inboard section 20 of the drum depicted in FIGS. 4, 5 and 9, the carcass alignment subassembly 50 includes a first plurality of positioning wheels 52 disposed about the outer circumference of the inboard section of the drum, and adjacent to the transverse centerplane 18 of the drum. Each positioning wheel 52 is provided with a plurality of barrel-type rollers 54 disposed at spaced apart locations about the outer circumference of the wheel. In one embodiment (see FIGS. 6 and 9), each of these rollers 54 is mounted within a depression 56 in the outer circumference 58 of its respective wheel for rotation about a rotational axis 60 that is aligned substantially parallel to a chord of the outer circumference of the wheel. As depicted, (see also FIGS. 5 and 14) each wheel is mounted between the legs 62 and 64 of a rocker arm 66 whose opposite end 68 is pivotally mounted, by a pin 69, to a cylindrical hub 71 which is mounted nonrotatably, but laterally slidably relative to the shaft 12. The axis of rotation 57 of the wheel 52 is disposed perpendicular to the axes of rotation of its respective rollers 54.

Figure 7:
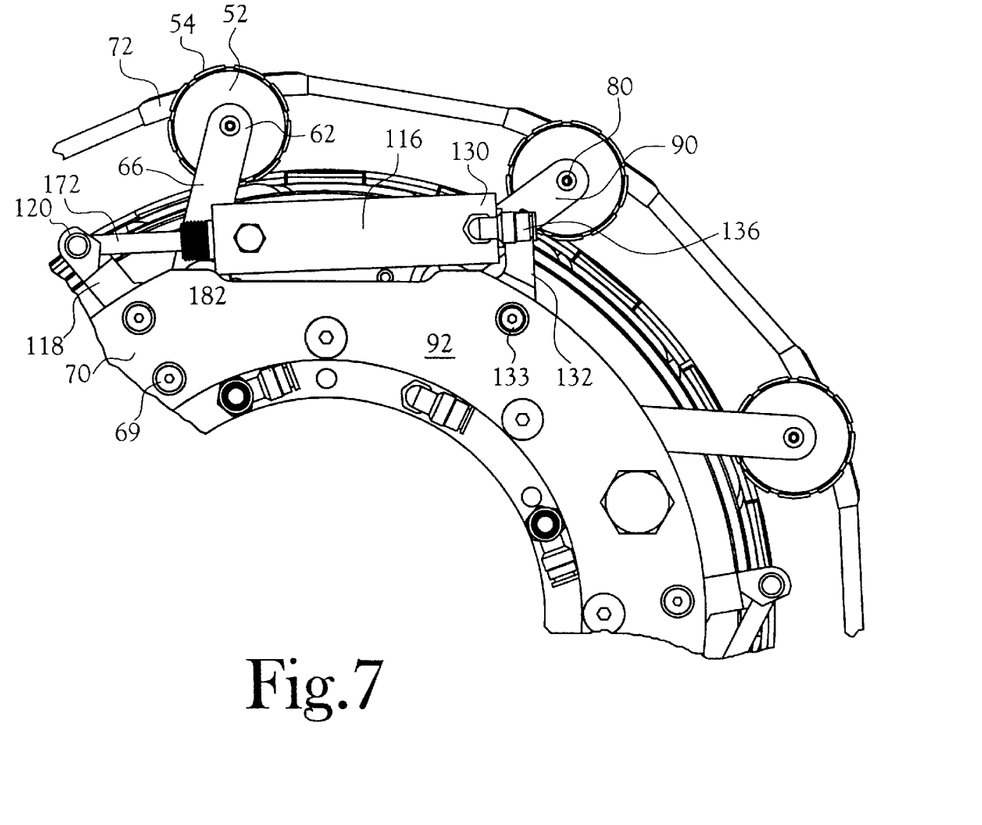
FIG. 7 is a further representation of a further portion of the right-hand section of the drum depicted in FIG. 4 and depicting further details of drum.
Figure 8:
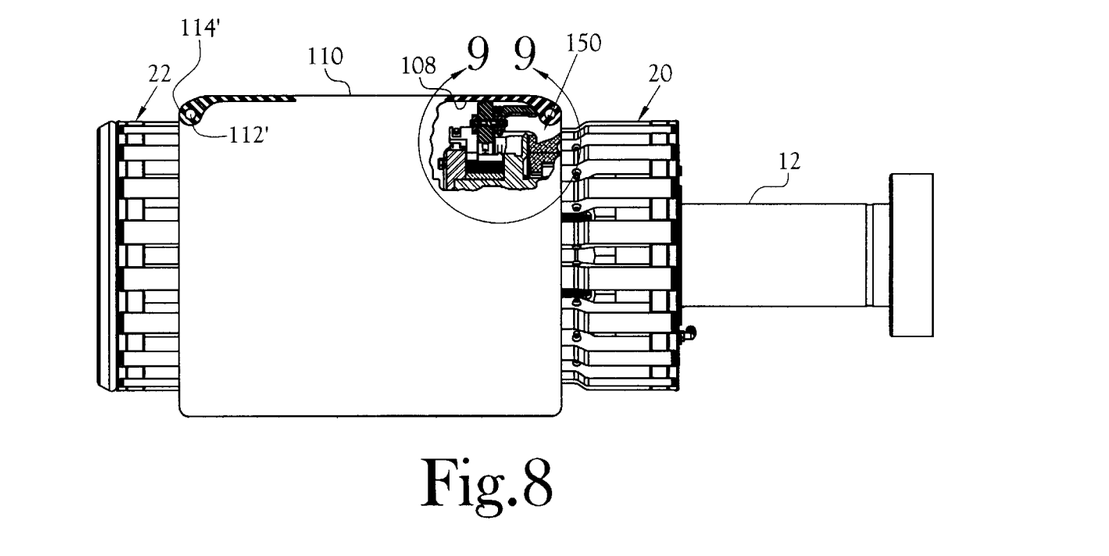
FIG. 8 is a side elevation view of a drum embodying various of the features of the present invention and depicting a green tire carcass encircling the drum.
Figure 13:
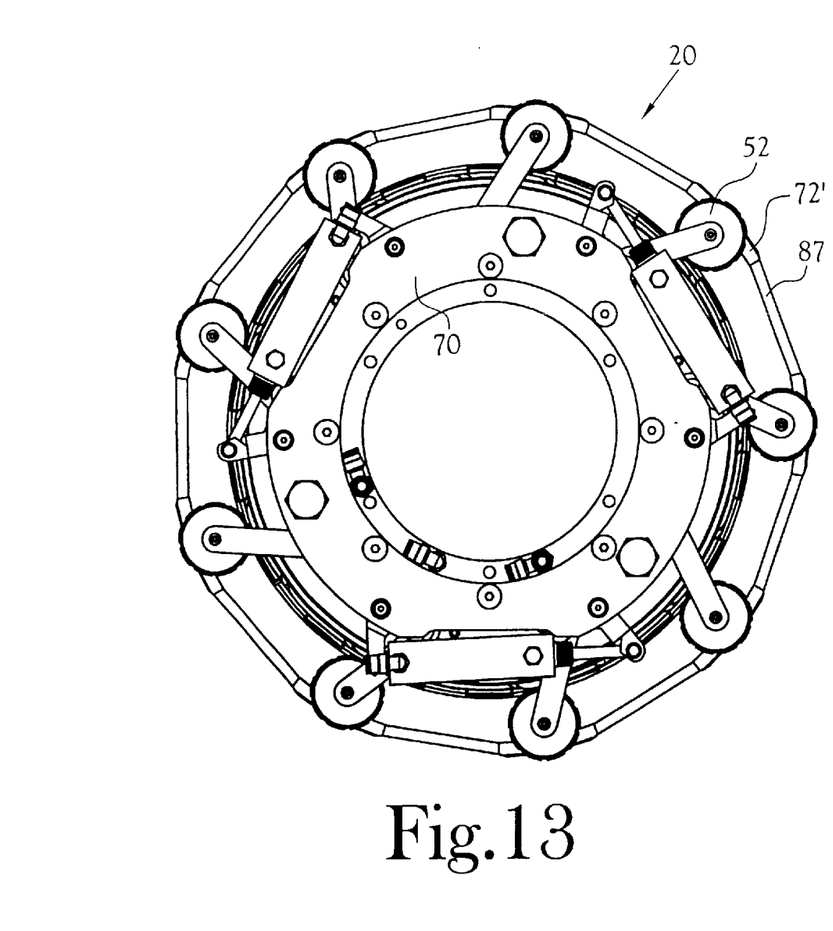
FIG. 13 is an end view of the drum section depicted in FIG. 12.

Referring also to FIG. 9, the carcass alignment subassembly 50 further includes a first plurality of lateral alignment shoes 72 also disposed about the outer circumference of the drum and immediately inboard of the first plurality of positioning wheels 52. Each lateral positioning shoe 60 comprises a generally arcuate, i.e., curved, body portion 74 including an outer surface 75 which defines a portion of an outer circumference of the drum. That edge 76 of the shoe disposed nearest the centerplane of the drum is provided with a bifurcated projection 78 which extends radially inwardly of the drum, terminating as legs 83,84, and receives therein a shaft 80 which is oriented substantially parallel to the rotational axis of the drum, and about which the shoe is pivotable. The opposite end 82 of the shoe projects in cantilevered fashion laterally outwardly of the drum from the bifurcated projection, and terminates in the form of a radially inwardly curved distal surface 84. As depicted in FIG. 9, each shoe is provided with a channel 85 which extends between opposite sides of the shoe and which opens outwardly of the surface 75 of the shoe. As depicted in FIGS. 7 and 13, for example, the shoes of each section of the drum are encircled by an elastic band 87 which resides in the channels of the several shoes of each section of the drum. By this means, the rotational movement of the shoes is restricted to a few degrees of rotation, thereby maintaining the orientation of the outer surface of each shoe generally concentric with respect to the outer circumference of the drum, but allowing a relatively small degree of freedom of rotation to provide for alignment of each shoe such that its distal edge properly engages the inner circumference of the carcass adjacent a respective bead ring. This elastic band is not shown in most of the drawings for purposes of clarity.

In one embodiment of the present invention (see FIG. 9), the positioning wheels 52 of the first plurality of positioning wheels and the lateral positioning shoes of the first plurality of positioning shoes are disposed in pairs, a pair comprising one wheel 52 and one shoe 72. In this embodiment, the wheel and shoe of each pair are rotatably/pivotally mounted on a common axis, which may comprise the common shaft 80 that is mounted between the bifurcated outboard legs 86,88 of a rocker arm 90 and which also extends to be received between the arms 82,84 of the bifurcated projection 76 of the shoe 72. The axis of this shaft 80 which mounts the wheel and shoe of each pair is disposed substantially parallel to the rotational axis 16 of the drum. In this embodiment, this common mounting of the positioning wheels and shoes is repeated in mirror image fashion on the opposite side of the centerplane of the drum with a second plurality of positioning wheels 52' and a second plurality of positioning shoes 60' associated with the outboard section of the drum.

As may be seen in FIGS. 4, 7 and 9, in the depicted embodiment of the present invention, the physical mounting of each shoe relative to its associated wheel, when employing a combination of wheels and shoes, provides for the arcuate radially outer surface 75 of each shoe to be disposed more radially inwardly of the drum relative to the outer circumference 58 of each wheel. This mounting relationship of the shoes and wheels provides for the inner circumference 108 or a carcass 110 which is initially threaded onto the drum to engage, and be supported by, the rollers in the outer circumference of each wheel with the inner circumference of the carcass spaced apart from the outer surface 75 of each shoe. This spacing of the carcass away from the outer surface of the shoes permits the carcass to be moved readily laterally of the drum and/or rotated about the rotational axis of the drum without impedance from the outer surfaces of the several shoes.

Referring to FIGS. 5, 6, 7 and 9, on a given side of the centerplane 18 of the drum, that end of each rocker arm 90 opposite its bifurcated end is provided with gear teeth 100 which mesh with like gear teeth 102 provided in the radially outward circumferential surface 104 of a driven gear ring 106 which is free-floating rotatably mounted on the outer circumference of the cylindrical hub 71 and adjacent the annular mounting ring 70. By this means, each of the rocker arms for each of the pairs of shoes and wheels is mechanically interconnected to every other of the rocker arms on a given side the centerplane of the drum so that upon rotation of the driven gear ring 106, all of the rocker arms pivot simultaneously in the same direction and by the same amount.

Referring to FIGS. 9–13, as so operably disposed, each of the positioning shoes 72 and each wheel 52 may be pivoted between a first (extended) position in which the outer surface of each shoe and the outer circumference of each wheel of each pair of shoes and wheels projects radially beyond the general outer overall circumference of the drum, and a second (retracted) position in which each pair of shoes and wheels is disposed radially inwardly of the general outer overall circumference of the drum. As noted, in their first positions (during carcass loading), the outer surface of the shoe is more radially inward of the drum than are the rollers of its respective wheel by a distance, e.g. about 2 inch, sufficient to create a space 77 between the outer surface 75 of each shoe and the internal cylindrical circumference 108 of a carcass 110 disposed on the drum 10, while at the same time positioning the radially inwardly extending edge 82 of each shoe to engage the carcass at a location adjacent a bead ring 112 disposed within an end 114 of the carcass.

Rotation of the driven gear ring is provided for by means of at least one, and in one embodiment, a plurality of piston/cylinder devices 116 operably interconnected between the fixed annular mounting ring 70 to which the rocker arms 90 are pivotally mounted, and one or more of the lever arms 118 (see FIGS. 6–9). In the depicted embodiment, each of the lever arms 118 includes a bifurcated end 120 between the legs of which the end 122 of a piston/cylinder rod 121 is pivotally pinned 123, and a distal end 124 which is provided with a plurality of gear teeth 126 which mesh with like gear teeth 1102 on the driven gear ring 106. Each lever arm is pivotally mounted, intermediate its opposite ends to the inner surface 67 of the annular mounting ring 70 as by a pin 128. The base end 130 of the cylinder of each piston/cylinder device is pivotally anchored to the outer circumference of the annular mounting ring 70 as by a mounting bracket 132 which is pinned 133 at one end 134 thereof to the inner surface 108 of the annular mounting ring 70 and whose opposite end includes a yoke 136 to which the base end of the cylinder is pinned.

Upon rotation of the driven gear ring 106 relative to the mounting ring 70 by means of actuation of the piston/cylinder devices(s) 116, each of the pairs of shoes and wheels on a given side of the centerline of the drum are caused to pivot either radially outwardly or radially inwardly relative to the rotational axis of the drum and thereby present the shoes and wheels for engagement therewith by the inner circumferential surface 108 of a carcass 110 being loaded onto the shaping drum, or to withdraw the shoes and wheels from engagement with the inner surface of such carcass.

Rotation of the driven gear ring 106' on the opposite side of the centerline of the drum is effected substantially identically as described. In one embodiment, the piston/cylinder devices 116, 116' disposed on the opposite sides of the centerplane are connected to a common source of hydraulic or pneumatic fluid and are controlled to function simultaneously and in like manner so that the wheels and shoes on both sides of the centerline of the drum move simultaneously and in like radial direction and extent of movement as do the wheels and shoes disposed on the opposite side of the centerline of the drum.

Figure 10:
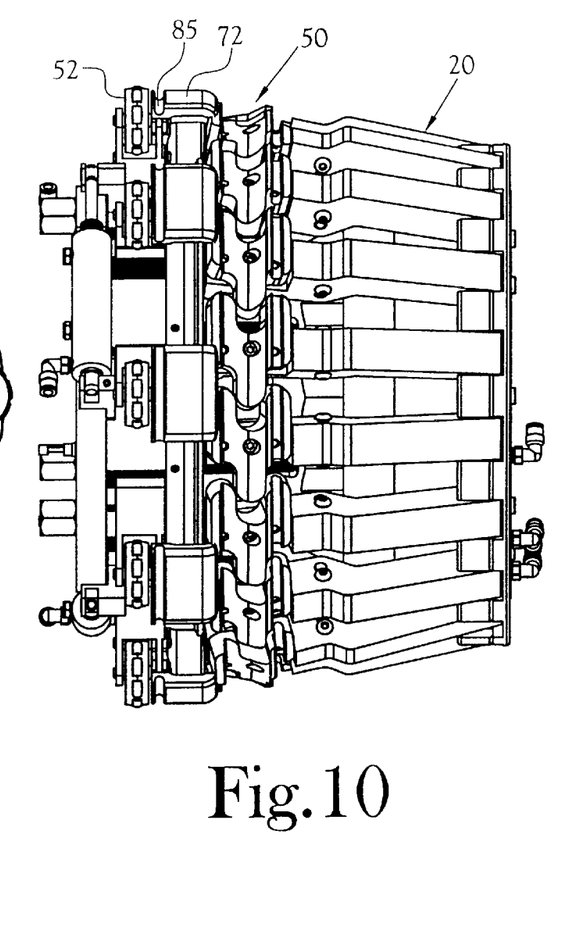
FIG. 10 is a side elevation view of the inboard section of a drum of the type depicted in FIG. 4 and showing the multidirectional wheels in their retracted positions.
Figure 11:
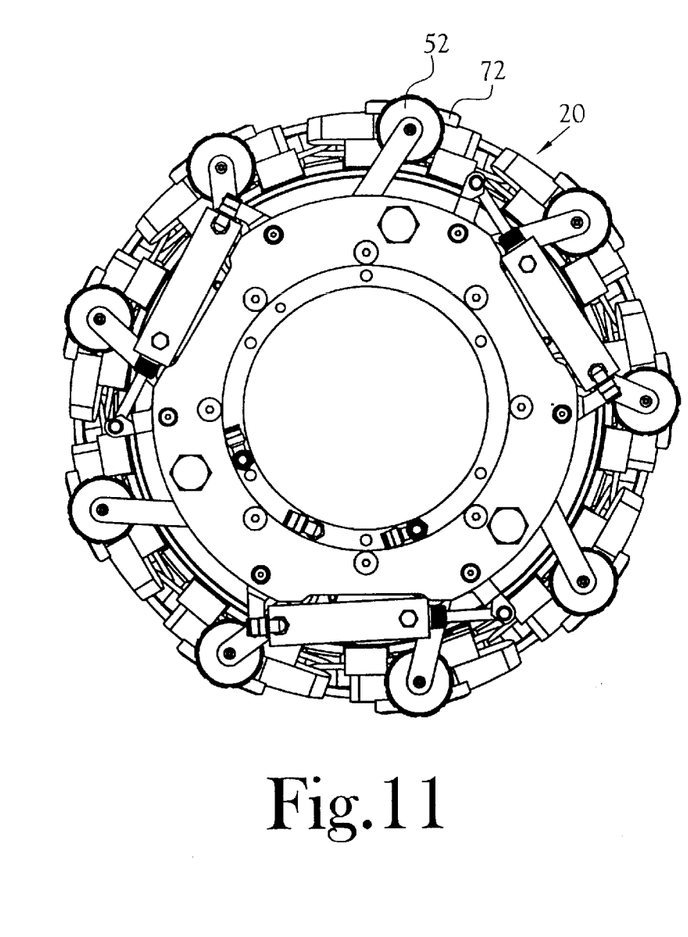
FIG. 11 is an end view of the drum section depicted in FIG. 10.
Figure 12:
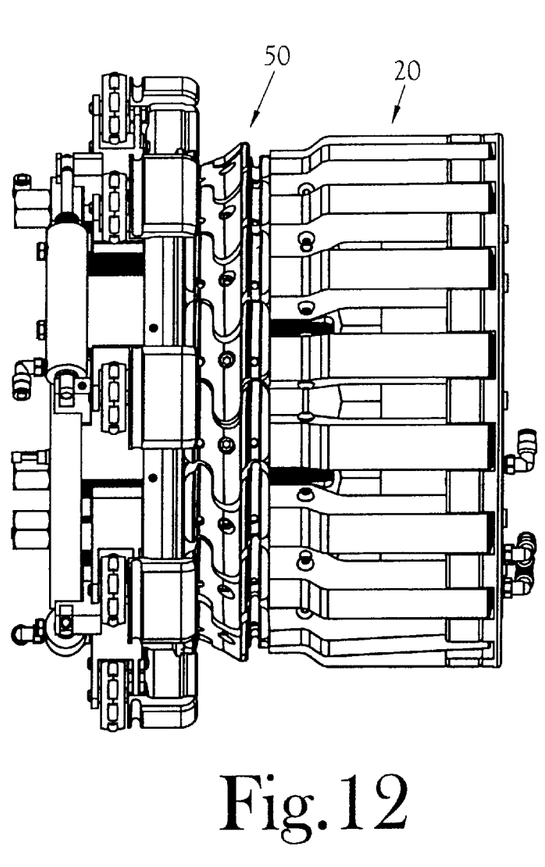
FIG. 12 is a side elevation view of the inboard section of a drum of the type depicted in FIG. 4 and showing the multidirectional wheels in their extended positions.

In accordance with one embodiment of the method of the present invention, in preparation of the shaping drum for the threading of a carcass thereon, the piston/cylinder devices are actuated to rotate the driven gear rings, causing each pair of the shoes and wheels to simultaneously pivot about their respective pivot axes in a direction toward their retracted positions radially inwardly of the drum. This position of the shoes and wheels is depicted in FIGS. 10 and 11 and provides for the passage of the bead ring-containing ends 114,114' past the wheels and shoes on respective outboard and inboard sections of the drum. Thereupon, the green tire carcass (see FIG. 8) is initially threaded onto the outboard end of the drum and into a position where each of its opposite ends is disposed generally in encircling relationship to a respective plurality of pairs of wheels and shoes.

Once the carcass has been manually threaded onto the drum to the extent that the bead rings 112, 112' at the opposite ends 114, 114' of the carcass (see FIGS. 7 and 8), are disposed laterally beyond the distal ends 84, 84' of the shoes of each of the first and second sections of the drum, radial movement of the wheels and shoes outwardly of the drum is commenced. As the outer surface of the rollers in the outer circumference of each wheel engage the inner circumference of the carcass, a radially directed pressure is exerted against the inner circumference of the carcass causing the carcass to be formed into a substantially uniform cylinder intermediate the bead rings in the opposite ends of the carcass.

Substantially simultaneously with the action of "rounding up" of the carcass and the slight laterally inward movements of the bead rings, the distal curved ends of the shoes on opposite sides of the centerplane engage the inner circumference of the carcass at locations laterally inwardly of their respective bead rings in the opposite ends of the carcass. The radially outward movement of these curved ends of the shoes against the inner circumference of the carcass develops a resultant vectorial force acting against each end of the carcass adjacent each bead ring, but in opposite directions laterally from the centerplane of the drum. Because the uniformly cylindrical carcass is supported on the rollers of the wheels, and each wheel is freely rotatable about an axis parallel to the shaft of the drum, the carcass is in position to be readily moved laterally of the drum in either direction so that the vectorial forces exerted against the inner circumference of the carcass move the carcass to a position wherein the bead rings are disposed substantially equidistantly from the centerplane of the drum. This action occurs very rapidly (on the order of 2–3 seconds) and once completed, the bead rings of the carcass are in position to be locked into engagement with the drum and the carcass expanded to define a tire, and/or for other operational processes to be performed thereon. When the formed tire is ready to be removed from the shaping drum, the driven gear rings are rotated to cause the wheels and shoes to retract to their retracted position radially inwardly of the drum so that the formed tire may be readily removed from the shaping drum.

Figure 6:
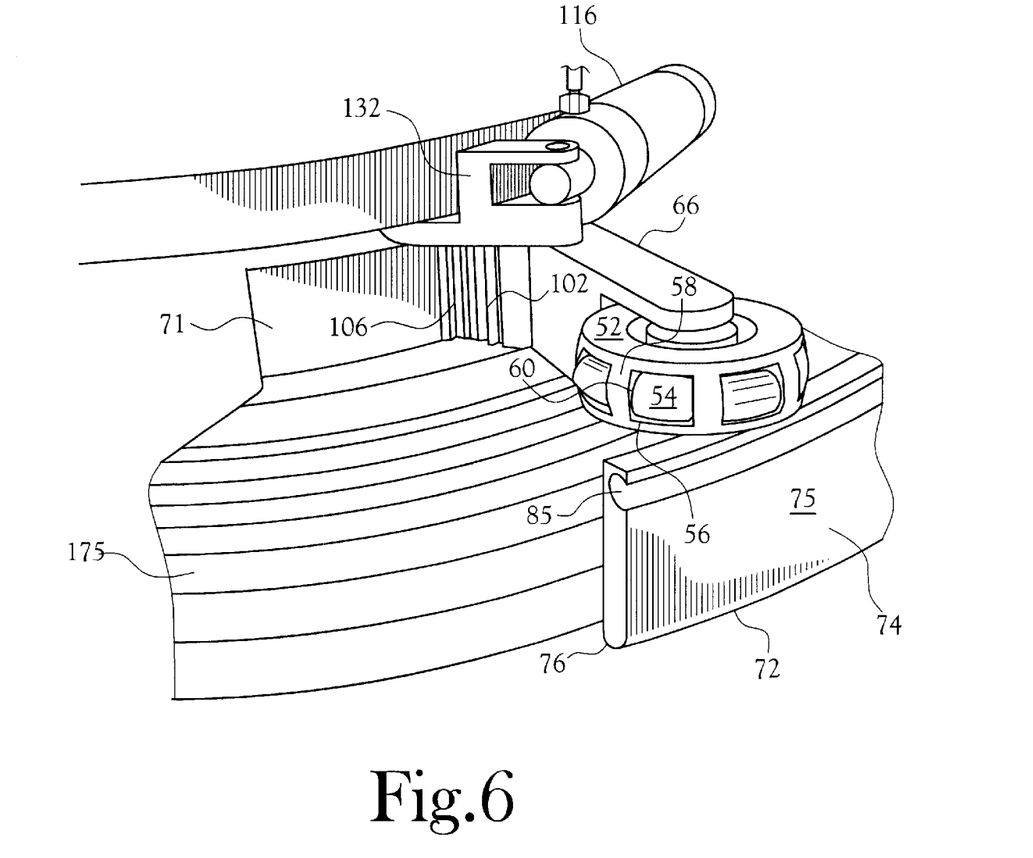
FIG. 6 is a representation of a portion of the right-hand section of the drum depicted in FIG. 4 and depicting spatial and functional relationships of the carcass positioning shoes and wheels employed in one embodiment of the present invention.

The construction and actuation of the bead ring clamps indicated generally by the numerals 150 and 150' (FIGS. 3, 8 and 9), may be of a design known in the art. The present bead ring clamping mechanism associated with each section of the drum includes a plurality of arms 160, each of which is individually pivotably mounted at one end 162 thereof, and each of which carries a bead ring clamp 164 on its opposite end 166. Actuation of the arms is by means of pressurized fluid introduced into a cylindrical chamber 168 to cause a cylinder 170 to move laterally of the drum and urge rollers 172 associated with the arms 160 toward engagement with a ramping surface 174 on each arm 160 and thereby urge the ends 166 of the arms 160, and their respective bead clamps radially of the drum to engage the bead rings. This mechanism is duplicated for the other section of the drum, and preferably, their respective actuations are coordinated to produce substantially simultaneous movement of the bead clamps. In FIGS. 5 and 6 there is depicted an elastomeric cylindrical covering 175 for the proximal ends of the bead locks. This covering is useful for protecting the proximal ends of the bead locks against contaminants, etc. and is omitted from others of the drawings for purposes of clarity.

As is true with known shaping drums, once the bead rings of the carcass have been locked to the drum, the carcass is inflated to expand the carcass into the desired toroidal shape. This action requires that the locked bead rings move simultaneously and equally inward of the drum toward the centerline of the drum. This action is accomplished through the means of the lead screw 23, its lead nuts 30 and their interconnection with the sections 20,22 of the drum. This structure, and its operation, are well known in the art.

In one embodiment, the gear teeth provided on the outer circumference of the driven gear ring are present only adjacent each of the inboard ends of the rocker arms, as opposed to gear teeth about the entire circumference of the driven ring. Other modifications and/or equivalents of the disclosed embodiments of the present invention will be recognized by one skilled in the art and it is intended that the invention be limited only as set forth in the claims appended hereto.

What is claimed is:

1. Apparatus for positioning a generally hollow cylindrical carcass on a drum having a centerplane and a central shaft defining a rotational axis of the drum, comprising:

first and second pluralities of positioning wheels, the wheels of said first plurality of wheels being disposed on one side of the centerplane of the drum, and said second plurality of wheels being disposed on an opposite side of the centerplane of the drum, each of said wheels of each of said plurality of wheels being mounted for rotation thereof about an axis aligned substantially parallel to the rotational axis of the drum, and including a plurality of rollers mounted in spaced apart relationship about the outer circumference of each of said wheels, said rollers being mounted for rotation about an axis oriented substantially perpendicular to said axis of rotation of their respective wheel, each of said wheels being mounted for substantially simultaneous radial positioning between first and second positions relative to the central shaft of the drum, whereby when in said first radial position, at least a portion of the outer circumference of each of said rollers of said wheels are disposed radially beyond the overall outer circumference of the drum and in position to engage the inner circumference of a carcass mounted on the drum in encircling relationship to said first and second plurality of wheels, and, when in said second position, said rollers are disposed radially inwardly of the overall outer circumference of the drum and out of engagement with the inner circumference of a carcass mounted on the drum, first and second pluralities of positioning shoes, the shoes of said first plurality of shoes being disposed on one side of the centerplane of the drum and the shoes of said second plurality of shoes being disposed on an opposite side of the centerplane of the drum, each of said shoes including a radially inwardly directed distal edge, rounded in cross section, and mounted for substantially simultaneous radial positioning between first and second positions relative to the rotational axis of the drum, whereby when said shoes are disposed in said first position, said distal edge of each of said shoes engages a respective end of said carcass in position to apply a laterally directed vectorial force against said respective end of said carcass upon radially outward movement of said shoes, and including means for substantially simultaneously adjusting the radial position of each plurality of shoes substantially equidistantly from the centerplane of said drum to thereby effect centering of said carcass relative to the centerplane of the drum, and wherein when said shoes are disposed in said second radial position, said shoes are disengaged from the carcass such that the carcass is removable from the drum.

2. The apparatus of claim 1 wherein said carcass comprises a green tire carcass for a vehicle tire.

3. The apparatus of claim 1 and including first and second pluralities of positioning shoes, the shoes of said first plurality of shoes being disposed on one side of the centerplane of the drum and the second plurality of shoes being disposed on an opposite side of the centerplane of the drum.

4. The apparatus of claim 3 wherein each of said shoes includes a radially inwardly directed distal edge, and said shoes are mounted for substantially simultaneous radial positioning between first and second positions relative to the central shaft of the drum, whereby when said shoes are disposed in said first position, said distal edge of each of said shoes engages a respective end of said carcass in position to apply a laterally directed vectorial force against said respective end of said carcass, and including means for substantially simultaneously adjusting the lateral position of each plurality of shoes substantially equidistantly from the centerplane of said drum to thereby effect centering of said carcass relative to the centerplane of the drum, and wherein when said shoes are disposed in said second radial position, said shoes are disengaged from the carcass such that the carcass is removable from the drum.

5. A shaping drum for use in the manufacture of a vehicle tire from a green flexible hollow cylindrical tire carcass, the drum including a rotational axis, and centerplane and first and second sections thereof disposed on opposite sides of the centerplane of the drum and being moveable laterally along the rotational axis of the drum in a direction toward or away from one another, comprising a first plurality of positioning shoes disposed on one side of the centerplane of the drum and a second plurality of positioning shoes disposed on the opposite side of the centerline of the drum, said shoes of each of said first and second plurality of shoes being pivotally mounted to a respective one of said first and second sections of the drum and about an pivot axis which is aligned substantially parallel to the rotational axis of the drum and at respective locations substantially equally spaced generally about the overall outer circumference of the drum, each of said shoes of a given one of said first and second plurality of shoes including a curved distal edge disposed laterally outwardly from the centerline of the drum, said curved distal edges of said shoes of a respective one of said first and second plurality of shoes collectively partially defining a generally circumferential locus of engagement of said distal edges of said shoes with one end of a carcass mounted in encircling relationship with respect to the drum and overlying said shoes of each of said first and second plurality of shoes, means for substantially simultaneously adjusting the lateral distance of each of said first and second pluralities of shoes relative to the centerplane of the drum to thereby urge the distal edges of respective ones of said shoes into engagement with a respective end of the carcass and exert a vectorial force laterally of the carcass on the drum to thereby center the carcass relative to the centerplane of the drum.

6. The shaping drum of claim 5 and including first and second pluralities of positioning wheels, the wheels of said first plurality of wheels being disposed on one side of the centerplane of the drum and between said first plurality of positioning shoes and the centerplane, and said second plurality of wheels being disposed on the opposite side of the centerplane and between said second plurality of shoes and the centerplane.

7. The shaping drum of claim 6 wherein each of said wheels is mounted for rotation about an axis which is aligned substantially parallel to the rotational axis of the drum, and including a plurality of rollers mounted in spaced apart relationship to one another about the outer circumference of each of said wheels, said rollers being mounted for rotation about an axis which is aligned substantially perpendicular to the rotational axis of their respective wheel.

8. The shaping drum of claim 7 wherein said first plurality of wheels is mounted for substantially simultaneous movement radially relative to the rotational axis of the drum between extended and retracted positions thereof.

9. The shaping drum of claim 6 wherein said first and second plurality of wheels is in its respective extended position, said rollers of said wheels are disposed radially beyond the overall circumference of the drum and beyond the locus of engagement of said distal edges of said shoes with the carcass, whereby the inner circumferential surface of a carcass disposed on the drum is engaged by said rollers to thereby render the carcass readily moveable laterally of the drum and/or rotationally about the rotational axis of the drum.

10. The shaping drum of claim 6 wherein said shoes of each of said first and second pluralities of shoes and said wheels of said first and second pluralities of wheels are mounted for substantially simultaneous radial movement thereof.

11. The shaping drum of claim 5 wherein each of said positioning shoes includes a roller mounted along at least one side of said shoe, said roller having a rotational axis which is aligned substantially parallel to the rotational axis of the shaping drum and further having at least a portion of its outer circumference disposed radially outwardly of the radially outer surface of said shoe whereby said at least a portion of said outer surface of said roller engages the inner surface of a tire carcass disposed on the shaping drum to at least partially support the tire carcass off the outer surface of said shoe, thereby enhancing lateral movement of the carcass by said shoe and accomplishing of centering of the carcass on the shaping drum.

12. The shaping drum of claim 11 wherein each of said shoes includes a second roller mounted along an opposite side of said shoe from said first roller.

13. The shaping drum of claim 11 wherein said roller comprises a barrel roller.

14. The shaping drum of claim 11 wherein said roller includes serrations in the outer circumference thereof, said serrations being aligned generally parallel to said rotational axis of said roller.

15. Apparatus for positioning a generally hollow cylindrical carcass on a drum having a centerplane and a central shaft defining a rotational axis of the drum, comprising:

first and second pluralities of positioning wheels, the wheels of said first plurality of wheels being disposed on one side of the centerplane of the drum, and said second plurality of wheels being disposed on an opposite side of the centerplane of the drum, each of said wheels of each of said plurality of wheels being mounted for rotation thereof about an axis aligned substantially parallel to the rotational axis of the drum, and including a plurality of rollers mounted in spaced apart relationship about the outer circumference of each of said wheels, said rollers being mounted for rotation about an axis oriented substantially perpendicular to said axis of rotation of their respective wheel, each of said wheels being mounted for substantially simultaneous radial positioning between first and second positions relative to the central shaft of the drum, whereby when in said first radial position, at least a portion of the outer circumference of each of said rollers of said wheels are disposed radially beyond the overall outer circumference of the drum and in position to engage the inner circumference of a carcass mounted on the drum in encircling relationship to said first and second plurality of wheels, and, when in said second position, said rollers are disposed radially inwardly of the overall outer circumference of the drum and out of engagement with the inner circumference of a carcass mounted on the drum.

16. A method of positioning a vehicle tire carcass on a drum having a centerplane, a central shaft defining a rotational axis of the drum and first and second sections disposed on opposite sides of the centerline of the drum comprising the steps of providing a first plurality of laterally positionable shoes on one side of the centerplane of the drum and a second plurality of laterally positionable shoes on the opposite side of the centerplane of the drum, each of said shoes of said first and second pluralities of shoes including a distal edge, said distal edges of each plurality of shoes collectively defining a generally circumferential locus of engagement of said edges with a respective end of a carcass disposed on the drum and encircling said first and second pluralities of shoes, said circumferential locus of engagement of said edges of said first plurality of shoes and said circumferential locus of engagement of said edges of said second plurality of shoes being disposed substantially equidistant from the centerline of the drum, providing a first plurality of positioning wheels on one side of the centerplane of the drum between said first plurality of shoes and the centerplane of the drum, providing a second plurality of positioning wheels on the opposite side of the centerplane of the drum, mounting each of said wheels of each of said plurality of wheels for rotation thereof about an axis aligned substantially parallel to the rotational axis of the drum, mounting a plurality of rollers in spaced apart relationship about the outer circumference of each of said wheels for rotation about an axis oriented substantially perpendicular to said axis of rotation of their respective wheel, further mounting each of said plurality of wheels for substantially simultaneous radial positioning between first and second positions relative to the rotational axis of the drum, whereby when in said first radial position, at least a portion of the outer circumference of each of said rollers of said wheels are disposed radially beyond the overall outer circumference of the drum in position to engage and support a carcass for free and independent movement laterally of the drum and rotatable about the rotational axis of the drum, disposing a carcass on the drum in encircling relationship to said first and second pluralities of shoes and said first and second pluralities of wheels with said circumferential locus of engagement of each of said pluralities of shoes in engagement with respective ends of the carcass and with said first and second pluralities of wheels adjusting the radial position of said first and second pluralities of shoes with respect to the rotational axis of the drum to thereby apply to each end of the carcass a vectorial force tending to equalize the distance of each locus of engagement from the centerplane of the drum.

17. The method of claim 16 and including the steps of mounting each of said shoes of each of said first and second pluralities of shoes for radial positioning between extended and retracted positions relative to the rotational axis of the drum, prior to the disposition of the carcass on the drum, moving said shoes to their respective radially retracted positions, and subsequent to the disposition of the carcass on the drum, moving said shoes to their respective radially extended positions, whereby the movement of said shoes toward their respective radially extended positions urges said distal edges of said shoes against respective ends of the carcass to develop a vectorial force laterally of the carcass to thereby adjust the position of the carcass relative to the centerplane of the drum.

18. The method of claim 16 wherein the carcass includes a bead ring embedded in each of the opposite ends thereof, and each end of the carcass containing a bead ring is radially less distant from the rotational axis of the drum than the inner circumferential surface of the carcass intermediate the bead rings, and said locus of engagement of each of said plurality of shoes is located laterally inwardly of a respective bead-ring-containing end of the carcass and radially inwardly of the inner circumferential surface of the carcass intermediate the bead rings.

19. The method of claim 16 and including the step of disposing the outer circumference of said rollers radially beyond the radial location of said shoes whereby only said distal edges of said shoes engage that portion of the carcass intermediate the opposite ends thereof when the carcass is supported by said rollers.

20. The method of claim 16 and including the step of interconnecting said shoes and wheels for substantially simultaneous radial movement thereof.

* * * * *